(12) United States Patent
Ikemoto (10) Patent No.: US 7,565,629 B2
(45) Date of Patent: Jul. 21, 2009

(54) INFORMATION PROCESSING APPARATUS

(75) Inventor: Kazuo Ikemoto, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 459 days.

(21) Appl. No.: 10/927,087

(22) Filed: Aug. 27, 2004

(65) Prior Publication Data

US 2005/0235229 A1 Oct. 20, 2005

(30) Foreign Application Priority Data

Apr. 15, 2004 (JP) ............................. 2004-119800

(51) Int. Cl.
*G06F 3/048* (2006.01)
*G06F 1/00* (2006.01)
*G06F 1/32* (2006.01)

(52) U.S. Cl. ...................... 715/867; 713/300; 713/320; 713/322; 713/323; 713/324; 713/330

(58) Field of Classification Search ................ 715/867; 713/300, 320, 322, 323, 324, 330
See application file for complete search history.

(56) References Cited

U.S. PATENT DOCUMENTS

| | | | | |
|---|---|---|---|---|
| 5,423,045 A * | 6/1995 | Kannan et al. | ............... | 713/322 |
| 5,548,763 A * | 8/1996 | Combs et al. | ............... | 713/323 |
| 6,516,421 B1 * | 2/2003 | Peters | ........................ | 713/502 |
| 6,789,206 B1 * | 9/2004 | Wierzbicki et al. | ......... | 713/300 |
| 6,845,456 B1 * | 1/2005 | Menezes et al. | ............. | 713/320 |
| 7,203,854 B2 * | 4/2007 | Luke et al. | ................... | 713/320 |

FOREIGN PATENT DOCUMENTS

| | | |
|---|---|---|
| JP | 10-013569 | 1/1998 |
| JP | 10-161622 | 6/1998 |
| JP | 2000-259272 | 9/2000 |
| JP | 2001-186040 | 7/2001 |
| JP | 3220015 | 8/2001 |
| JP | 2002-73225 | 3/2002 |
| JP | 2003-76352 | 3/2003 |

OTHER PUBLICATIONS

Absolute ScreenSaver Changer, Wayback Machine, Feb. 1, 2003 (http://absolutist.com/ssaver/chang/).*
Russel Charlie, Power Management in Windows XP, Mar. 25, 2002, www.microsoft.com.*
Office Action mailed on Sep. 2, 2008 in the corresponding Japanese Patent Application No. 2004-119800 (1 page).

* cited by examiner

*Primary Examiner*—Tadesse Hailu
*Assistant Examiner*—Nicholas S Ulrich
(74) *Attorney, Agent, or Firm*—Staas & Halsey LLP (57) ABSTRACT

If a screen saver with a high load is set, a shift to standby mode cannot be executed without clearing the screen, and clearing of the screen causes problems. The present invention provides an electronic device with a screen to display, including a first screen saver section executing a first screen saver during a first execution period and a second screen saver section executing a second screen saver, of which an execution load on said electronic device is lower than the first screen saver, after said first execution period has elapsed.

14 Claims, 5 Drawing Sheets

INFORMATION PROCESSING APPARATUS

BACKGROUND OF THE INVENTION

1. Field of the Invention

The present invention relates to an information processing apparatus having a display unit for displaying information to the user, such as a personal computer, and more particularly to an information processing apparatus where the screen saver displayed on the display unit is executed without interrupting the power saving function, a terminal control program and a screen saver program for executing the screen saver without interrupting the power saving function, and a terminal control method for preventing a burn-in of the display unit without interrupting the power saving function.

2. Description of the Related Art

In many information processing apparatuses, such as personal computers (hereafter called PC), portable telephones and PDAs (Personal Digital Assistants), it is set such that a screen saver program, for displaying images (still pictures, moving pictures) on a display unit when operation by the user is not performed for a predetermined period (screen saver activation period), is activated so as to prevent a burn-in of the display unit, such as a CRT (Cathode Ray Tube) connected to the information processing apparatus. Operation by the user is, for example, key input from the keyboard, input by moving or clicking the mouse, and pressing the power supply button.

Initially a screen saver was for protecting the display unit and was not created with concern for the user, so a relatively simple visual effect (e.g. a logo was displayed at various locations on the screen at a time interval) was displayed on the display unit. Recently, however, screen savers for displaying more elaborate visual effects that attract the interest of the user are seen on the market. Actually such screen saver programs having more elaborate visual effects tend to attract users even more. But for the processing of such screen savers with elaborate visual effects, a complicated operation, such as image processing requiring high computing amount, is required and more resources, such as a CPU (Central Processing Unit), memory and hard disk, are required, and as a result, the load on the information processing apparatus increases.

On the other hand, in information processing apparatuses, when operation by the user is not performed for a predetermined time (standby shift period), the program shifts to standby mode where power consumption is lower, so as to acquire authentication conforming to the power saving standard specified by the standards organization. In standby mode, the setup information is saved in the memory, and power is supplied only to areas required for saving the setup information. When the operation by the user is performed, the setup information is read from the memory, and the information processing apparatus is returned to and controlled to be the operating status before standby mode.

Even if a shift to standby mode is set, the information processing apparatus does not shift to standby mode while executing a processing which requires high load on the information processing apparatus (e.g. processing consuming considerable CPU time) via the OS (Operating System). This is because of preventing the interruption of important processing for the user, such as technology computation being executed in the background by shifting to standby mode by mistake. Recently some screen savers impose loads onto the system higher than the level which stops the information processing apparatus from shifting to standby mode because of the visual effects thereof, so if the load of the screen saver that the user sets is high, the system does not shift to standby mode at all.

To prevent this situation (as a work around), the information processing apparatus does not perform the processing of the screen saver, if the display unit is cleared (e.g. power of the liquid crystal display is OFF/standby separately from the PC main body) to decrease the load on the information processing apparatus. So if the user do not operate for a predetermined period (screen clear period), the information processing apparatus turns OFF the power supply of the display unit so as to prompt a shift to standby mode.

As a technology related to screen savers and power saving functions, it is proposed that if the operation not necessary to be displayed on the display device (e.g. operation of playback or fast forward button of the CD player function) is executed in standby mode by the user, the power saving status of the display device is maintained (Japanese Patent Application Laid-Open No. 2002-73225), and it is proposed to further decrease power consumption by intermittently supplying the power to one means which can automatically detect a return signal after synchronization signals are not longer detected in the display device (Japanese Patent Application Laid-Open NO. 2003-76352). It is also proposed that in the display of a mobile communication terminal, when standby mode where the screen saver is executed shifts to partial mode where the screen saver ends, if the display content of the conventional display does not change very much during the shift, the ratio of the screen saver image in the entire display is gradually decreased in steps to impress the user changing (Japanese Patent Application Laid-Open No. 2001-186040), and it is also proposed that after the screen saver is executed, the display is turned OFF and the display of the screen saver disappears if an electronic mail does not arrive for a predetermined time after the execution of the screen saver (Japanese Patent No. 3220015).

SUMMARY OF THE INVENTION

In the above mentioned prior art, however, if the user sets a screen saver where the load on the information processing apparatus is high, the screen saver, which itself is not very important for the user, disables the information processing apparatus to shift to standby mode, and delays the shift to standby mode.

If the power supply of the display unit (e.g. liquid crystal display) is turned OFF after the screen clear period has elapsed in the information processing apparatus, so as to implement both the power saving function (shift to standby mode) and executing of the screen saver which the user desired and which has high load, then a user of a desktop type PC, for example, may misunderstand the status as a failure where the power of the main unit is ON but the display unit is OFF.

With the foregoing in view, it is an object of the present invention to provide an information processing apparatus that executes a shift to standby mode during the preset shift period even if a screen saver with a high load is set. It is another object of the present invention to provide an information processing apparatus that does not clear the display unit image at the shift to standby mode.

The above object is achieved by the first aspect of the present invention, that is by providing an electronic device with a screen to display, including a first screen saver section executing a first screen saver during a first execution period, and a second screen saver section executing a second screen saver, of which an execution load on said electronic device is lower than the first screen saver, after said first execution period has elapsed.

The above object is also achieved by the second aspect, that is by providing the electronic device according to the first aspect, further including a standby control section shifting to standby mode for decreasing a power consumption of said electronic device after the second execution period has elapsed from a start of the execution of said first screen saver.

The above object is also achieved by the third aspect, that is by providing the electronic device according to the second aspect, wherein said second screen saver section executes said second screen saver from an end of the execution of said first screen saver to shifting to said standby mode.

The above object is also achieved by the fourth aspect, that is by providing the electronic device according to the first aspect, wherein when data is input to said electronic device, the execution of said first screen saver or said second screen saver is stopped.

The above object is also achieved by the fifth aspect, that is by providing a storage medium in which a program executed in a computer with a screen display faculty is stored. The program causes the computer function as first screen saver means which executes a first screen aver during a first execution period and as second screen saver means which executes a second screen saver of which an execution load on said computer is lower than the first screen saver, after said first execution period has elapsed.

The above object is also achieved by the sixth aspect, that is by providing a control method to be executed in a computer having a screen display function, including a first screen saver step of executing a first screen saver during a first execution period; and a second screen saver step of executing a second screen saver of which an execution load on said computer is lower than the first screen saver, after said first execution period has elapsed.

According to the present invention, the information processing apparatus can be shifted to the standby mode during a preset standby shift period, even if a screen saver with a high load is set. Also the information processing apparatus can be shifted to standby mode without clearing the display section image.

DESCRIPTION OF THE PREFERRED EMBODIMENTS

Embodiments of the present invention will now be described with reference to the drawings. The technical scope of the present invention, however, is not limited to the embodiments but extends to the inventions stated in the Claims and the equivalents thereof.

Figure 1:
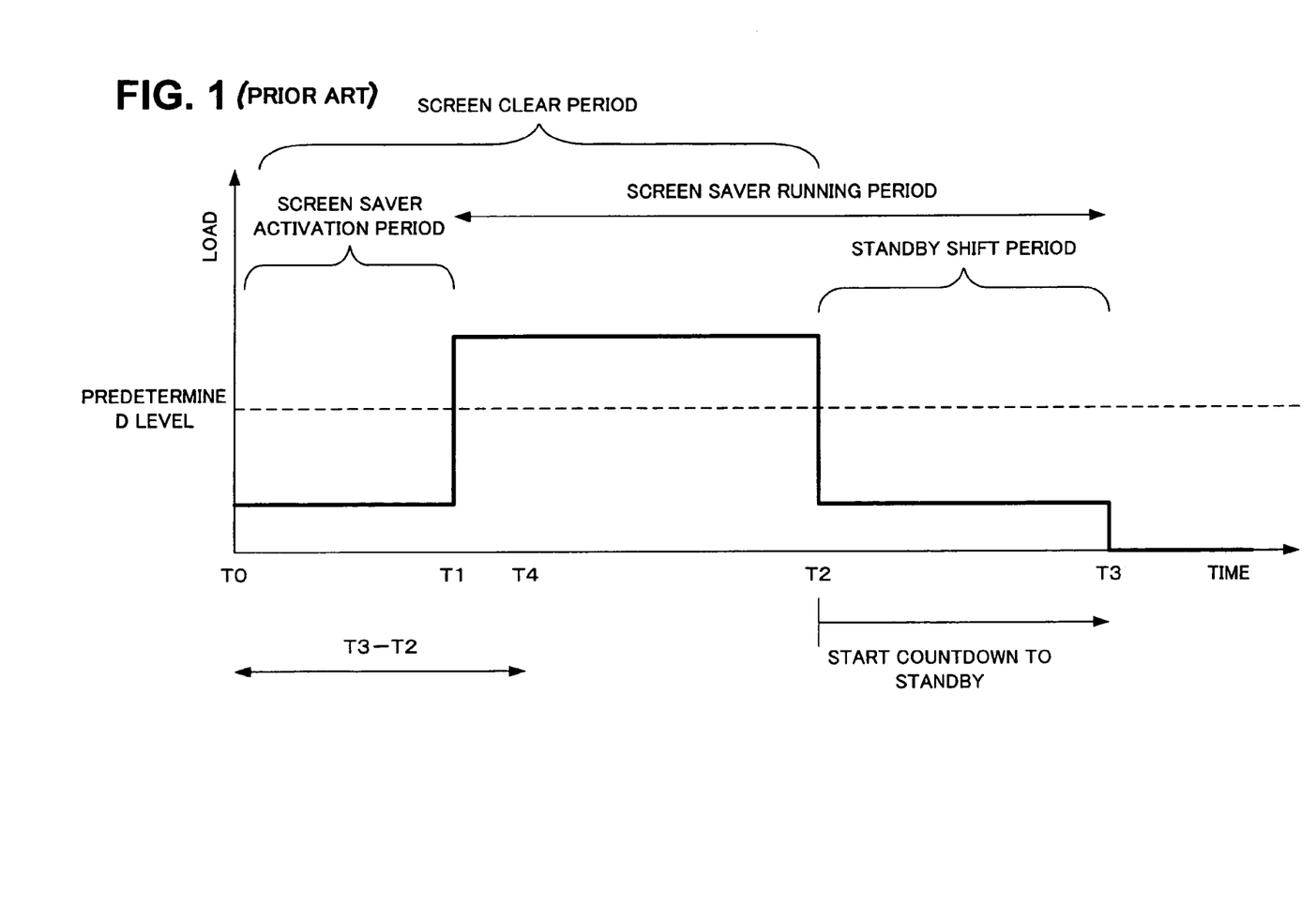
FIG. 1 is a diagram depicting a status of a conventional information processing apparatus shifting to the standby mode.

FIG. 1 is a diagram depicting the status until a conventional information processing apparatus shifts to the standby mode. The level indicated by the dotted line is a boundary of the load to be used by the OS to determine whether the shift to the standby mode is executed. If the load extends beyond this dotted line, the OS does not execute the shift to standby mode.

At first, if the user did not operate the system during the screen saver activation period, the screen saver is activated (time T1). The screen saver is also activated when instructed by the user. During activation of the screen saver, the load exceeding the dotted line is applied to the system, so a shift to the standby mode is not executed. If the user did not operate the system during the preset screen clear period from time T0, the OS shifts the power supply of the display monitor to the standby status, for example, and clears the screen (time T2).

When the screen is cleared, the drawing operation of the screen saver is stopped, so the load on the system becomes the dotted line or less, and the countdown to shift to the standby mode is started from time T2, and if the user did not operate the system during the standby shift period, the OS executes a shift to the standby mode (time T3). In this case, the user did not operate the system at all from time T0 to time T3, and the execution of the screen saver itself is not an important processing, so a shift to the standby mode may be generated near time T4 after the standby shift period has elapsed from time T0.

However, as FIG. 1 shows, the system does not shift to standby mode at this timing. As a result, activating the screen saver with a high load causes a delay in the shift to the standby mode. As a means of preventing this, it is necessary to clear the screen (time T2) to decrease the load of the system.

Now the embodiments of the present invention will be described.

Figure 2:
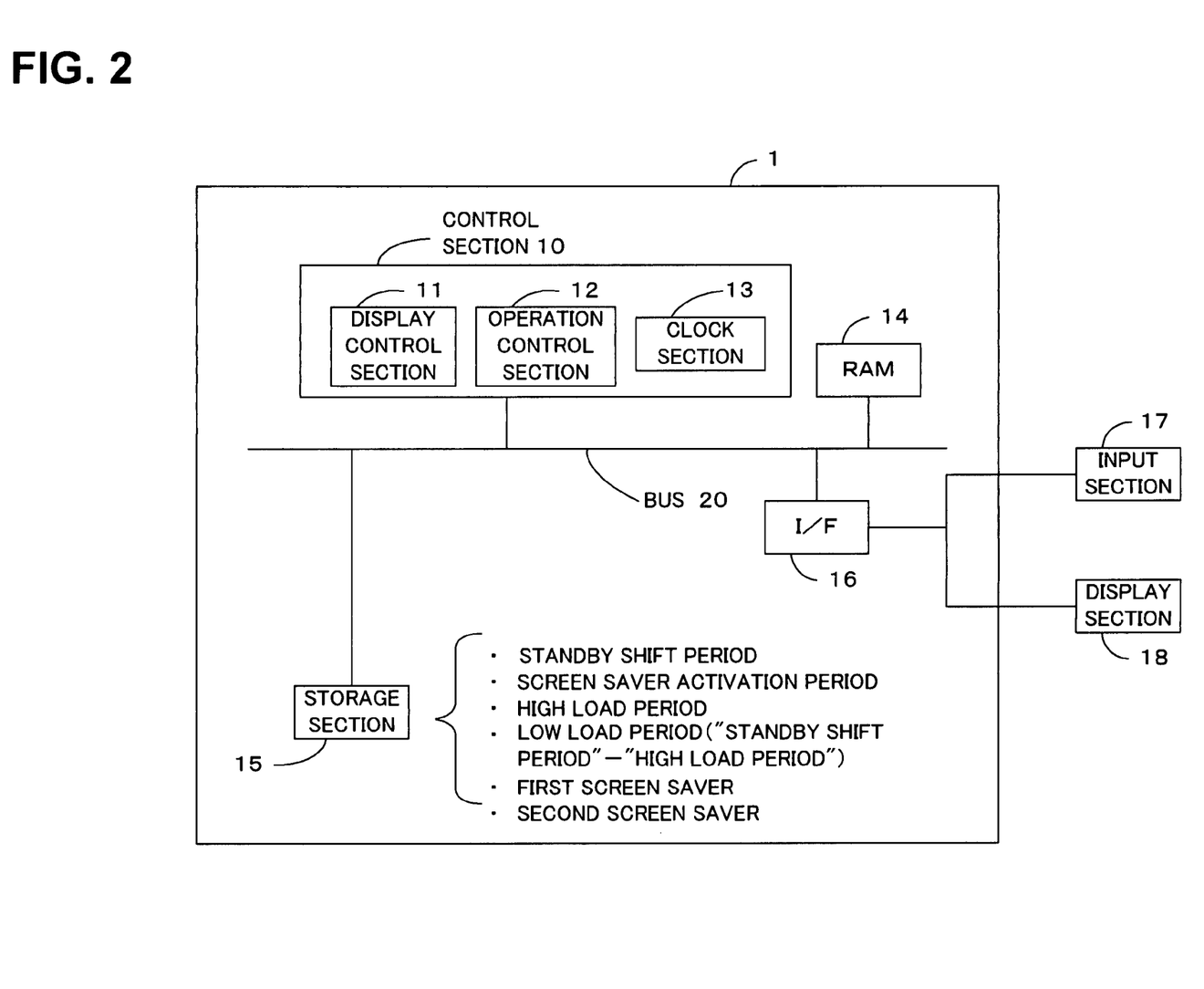
FIG. 2 is a block diagram depicting a configuration of an information processing apparatus according to an embodiment of the present invention.

FIG. 2 is a block diagram depicting the configuration of the information processing apparatus 1 according to an embodiment of the present invention. The information processing apparatus 1 in FIG. 2 has a control section 10, RAM (Random Access Memory) 14 and a storage section 15, which are inter-connected via a bus 20, and through an interface for peripheral equipment connection which is also connected to the bus 20, the input section 17 and display section 18 outside are connected. These connection formats may be either wire or wireless.

The storage section 15 is a non-volatile storage means such as a hard disk, optical disk, magnetic disk and flash memory, which stores data for specifying the standby shift period, that is a period until shifting to the standby mode when the load of the information processing apparatus continues to be less than a predetermined level, data for specifying the screen saver activation period, that is a period until the screen saver is activated when the user continues not to operate the system, a first screen saver program and a second screen saver program of which load is lower than that of the first screen saver and lower than the boundary of the load (e.g. dotted line in FIG. 1) used by the OS to determine the shift to the standby mode, data for specifying the high load period, that is a period to execute the first screen saver, and data for specifying the low load period, that is a period to execute the second screen saver.

The display section 18 is a display device for displaying information on the user, such as a liquid crystal display and CRT, and the input section 17 is an input device for inputting the input signals of the instructions (commands) from the user to the information processing apparatus 1, such as a keyboard, mouse and power supply button. The signal or data, which is received via a network, omitted in FIG. 2, may be input via the input section 17. The RAM 14 is a storage means for temporarily storing the operation result in the processing of the information processing apparatus 1.

The control section includes a display control section 11, operation control section 12 and clock section 13. The clock section 13 functions as a countdown timer, sets a period according to the count down start instruction, which is input from the display control section 11 and operation control section 12, and counts down until a reset instruction is received. When the count becomes 0, this is notified to the corresponding control section.

The display control section 11 determines the high load period for executing the first screen saver program, which is a screen saver program with a high load, based on the standby shift period initially set in the information processing apparatus 1. If the high load period is determined, the low load period is automatically set. The method for determining the high load period and low load period will be described later.

The clock section 13 counts down with the high load period as an initial value. Then the timing, when this counter becomes 0, matches the timing when the first screen saver is switched to the second screen saver with a lower load. At this timing, the display control section 11 can switch to the second screen saver. That is, the display control section 11 executes the first screen saver program during the high load period, and then switches it so as to execute the second screen saver program during the low load period.

The operation control section 12 periodically detects the load status on the information processing apparatus, and when the status, where the load of the information processing apparatus is less than a predetermined level, exceeds the standby shift period, the operation control section 12 shifts the information processing apparatus 1 to the standby mode. In the standby mode, the setup information is saved in the memory, and power is supplied only to areas required for saving the setup information.

According to an embodiment of the present invention, the load on the information processing apparatus 1, when the second screen saver program is executed, is less than the boundary of the load which is used by the OS to determine the shift to the standby mode, so the shift to the standby mode occurs when the second screen saver program is executed.

In this way, even if the first screen saver which has a high load, that has a strong attraction for the user, is displayed, it is switched to the second screen saver which can cause the shift to the standby mode, after a predetermined period has elapsed, so the shift to standby mode is possible without clearing the screen even if a screen saver with a high load is executed. Also switching the first screen saver to the second screen saver has the effect of not boring the user.

The operation control section 12 can reset the low load period to a new standby shift period. In this case, the information processing apparatus 1 shifts to the standby mode at the same time with the end of the display of the second screen saver, and the shift to the standby mode can be induced with certainty when the standby shift period, which is initially set in the information processing apparatus 1, has elapsed after the screen saver is activated.

The display control section 11, operation control section 12 and clock section 13 in FIG. 2 can be constructed as hardware, but may be constructed as a program that is executed by the CPU, not illustrated, installed in the information processing apparatus 1. The configuration in FIG. 2 is based on the assumption that the information processing apparatus (main body) 1 is externally connected with such an input section 17 as a keyboard and such a display section 18 as a CRT, like a desktop PC, but the present embodiment can be applied to a notebook PC, PDA, portable telephone and wrist watch, and in this case, the input section 17 and display section 18 in FIG. 2 may be internally connected to the information processing apparatus 1.

Figure 3:
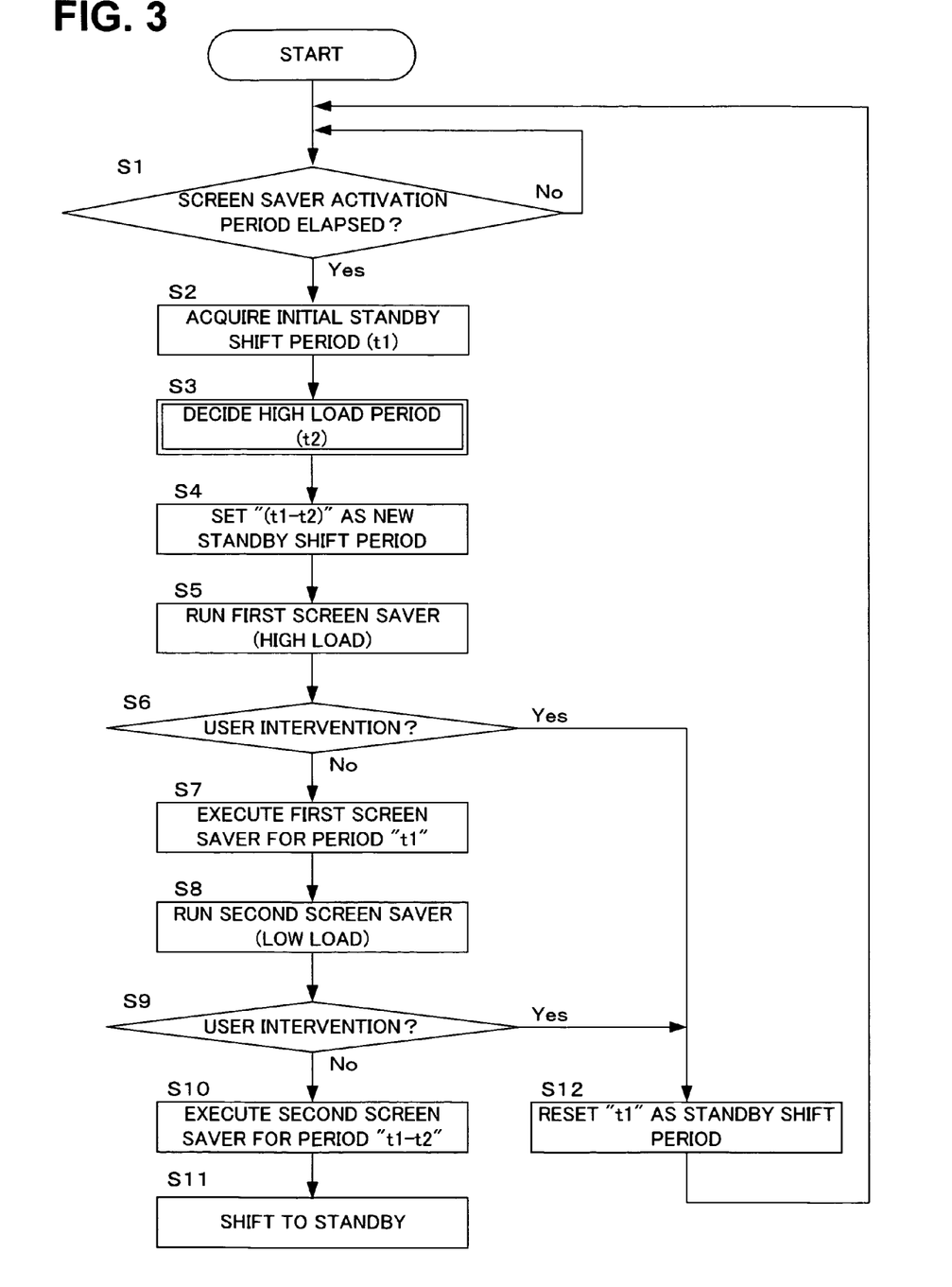
FIG. 3 is a flow chart depicting the operation of an information processing apparatus until shifting to the standby mode.

FIG. 3 is a flow chart depicting the operation of the information processing apparatus 1 until shifting to the standby mode. At first, it is judged whether the status where the user does not operate the system continues for the screen saver activation period (S1). When operation by the user stops, the display control section 11 instructs the clock section 13 to start the countdown of the time for activating the screen saver. The clock section 13, which received the countdown instruction from the display control section 11, starts countdown with the screen saver activation period, which has been stored in the storage section 15 in advance, as an initial value.

If an operation instruction is input by the user during this time, the display control section 11 instructs a rest to the clock section 13, the clock section 13 resets the timer for activating the screen saver, and stands by until the next countdown start instruction comes from the display control section 11. When the timer for activating the screen saver becomes 0, the clock section 13 notifies the display control section 11 that the screen saver period has elapsed.

In step S1, it is judged whether the time for activating the screen saver of the clock section 13 is 0, and if not 0, the screen saver activation period has not yet elapsed (NO in S1), so step S1 is continued periodically.

When the screen saver starting period where the user does not operate the system has elapsed (YES in S1), the display control section 11 acquires the initial standby shift period (period t1) which is currently set (S2). In step S2, the standby shift period can be acquired as follows.

When the OS in use is Windows (registered trademark), for example, the display control section 11 refers to the value of "user.IdleTimeoutAc" if an AC power supply is connected, or refers to the value "user.IdleTimeoutDc" if a battery is used, from the POWER_POLICY structure that can be acquired using GetCurrentPowerPolicies API. Each value indicates the standby shift period. If these values are 0, the setting of standby shift is "NO", so a shift to the standby mode does not occur, regardless the load on the information processing apparatus.

Information on whether the power supply is an AC power supply or a battery can also be acquired using GetSystemPowerStatus API. For this, the value "ACLineStatus" included in the SYSTEM_POWER_STATUS structure acquired using GetSystemPowerStatus API is referred to. If the value is 0, the power supply is judged as a battery, and if not 0, it is judged as AC power supply connection status, so the display control section 11 can acquire the standby shift period.

Based on the period t1, the display control section 11 decides the high load period (period t2), which is the execution period of the first screen saver, and stores the data in the storage section 15 (S3). The period (t1-t2), that is the period when the high load period t2 is subtracted from the initial standby shift period t1, is the low load period, and the display control section 11 also stores this data in the storage section 15. The decision of the high load period will be described later with reference to FIG. 4.

When the high load period and low load period are determined, the operation control section 12 sets the low load period as the new standby shift period (S4). The processing in step S4 means that the data on the standby shift period stored in the storage section 15 is overwritten with the data on the low load period, and in the case of Windows (registered trademark), for example, the operation control section 12 can set a new standby shift period to the value corresponding to the standby shift period of the POWER_POLICY structure, described in step S2, by using SetActivePwrScheme API.

In this case, the operation control section 12 saves the original initial standby shift period t1 in RAM 14 in advance. Since the low load period is the execution period of the second screen saver, the information processing apparatus 1 shifts to the standby mode when the processing of the second screen saver ends by the processing in step S4. In the present invention, the load of the second screen saver is sufficiently low to induce a shift to the standby mode even if the new standby period is not set, so the processing in step S4 may not be executed.

The display control section 11 activates the first screen saver (S5). At this time, the display control section 11 instructs the clock section 13 to start the countdown of the timer for the first screen saver. The clock section 13 starts the countdown with the high load period stored in the storage section 15 as the initial value.

If the user operates the system during the activation of the first screen saver (YES in S6), the operation control section 12 sets the initial standby shift period, which was saved in RAM 14 in step S4, again as the standby shift period (S12), and returns to step S1.

When the first screen saver is displayed on the display section 18 for period t1 (high load period) and the timer for the first screen saver becomes 0 (S7), the display control section 11 switches it to the second screen saver (S8). At this time, the display control section 11 instructs the clock section 13 to start the countdown of the timer for the second screen saver. The clock section 13 starts the countdown with the low load period saved in the storage section 15 as the initial value.

If the user operates the system during the activation of the second screen saver (YES in S9), the operation control section 12 sets the initial standby shift period, which was saved in RAM 14 in step S4, again as the standby shift period (S12), and returns to step S1.

The display control section 11 displays the second screen saver on the low load period (period t1-t2) display section 18, and ends the second screen saver when the timer for the second screen saver becomes 0 (S10). The load of the second screen saver is low enough to induce a shift to the standby mode, and since the new standby shift period, which was set in step S4, has elapsed, the operation control section 12 shifts the information processing apparatus 1 to the standby mode (S11). The execution load of the second screen saver may be changed to be lower than the level that the shift to the standby mode can be induced, corresponding to the execution load of the information processing apparatus 1.

Now an example of a method for determining the high load period will be described.

Figure 4A:
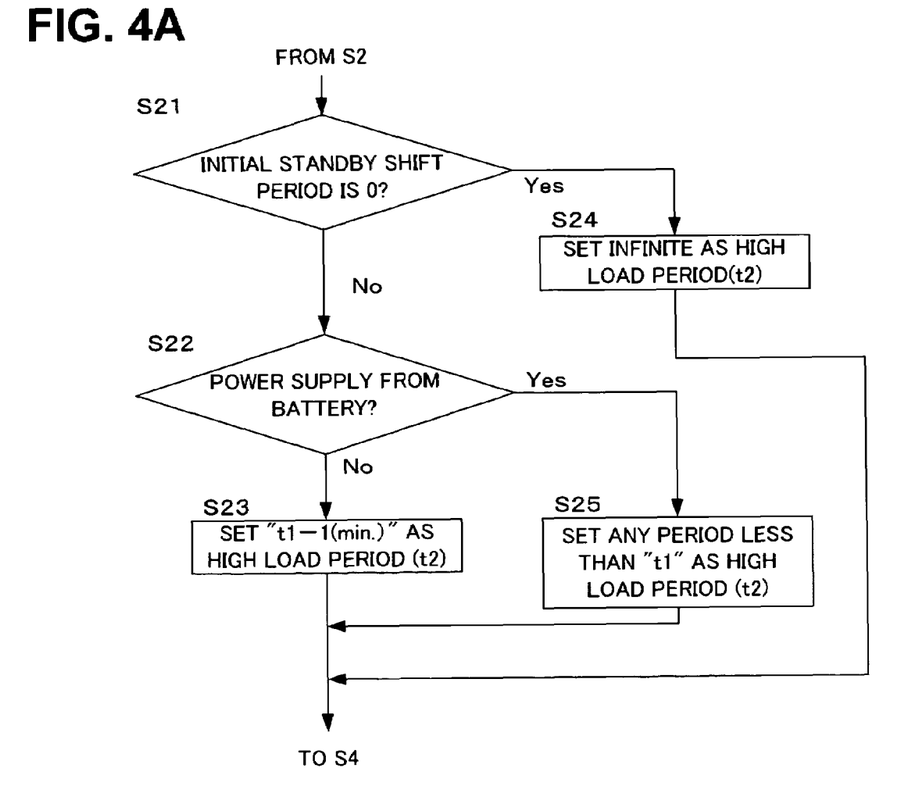
FIGS. 4A and B are flow charts depicting examples of a method for determining the high load period.
Figure 4B:
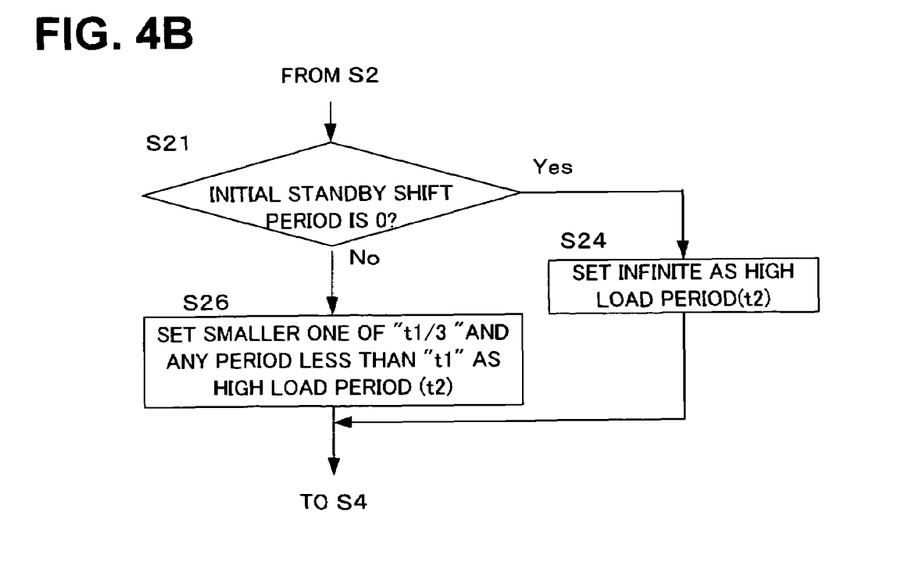

FIG. 4A and FIG. 4B are two flow charts depicting an example method for determining the high load period (t2) in step S3 in FIG. 3. In FIG. 4A, the high load period is set based on the power supply configuration of the information processing apparatus.

At first, the display control section 11 judges whether the setting of the standby shift is "NO" (S21). This can be judged depending on whether the value acquired from the POWER_POLICY structure in step S2 is 0 or not. If the standby shift is "NO" (YES in S21), it is unnecessary to consider a shift to the standby mode, so the high load period is set to "infinite" (S24). The low period also becomes "infinite".

If some standby shift period has been set (NO in S21), the display control section 11 judges whether the power supply configuration is a battery (S22). This can be judged by the value of ACLineStatus included in the SYSTEM_POWER_STATUS structure described in step S2, for example.

If it is battery status (YES in S22), the high load period is set to any period less than the initial standby shift period (t1) (S25). If it is AC supply connection status (NO in S22), the high load period is set to a value when one minute is subtracted from the initial standby shift period (S23).

The setting in step S23 is for displaying the first screen saver, which is more attractive for the user, for as long as possible, since the system is in AC power supply connection status, so the issue of battery power is of no concern. If it is battery status in step S25, it is desirable to set the time according to the classification based on the remaining battery power, for example. The predetermined time in step S25 may be allowed for the user to set.

FIG. 4B is another example method for determining the high load period.

At first, the display control section 11 judges whether the setting of the standby shift is "NO" (S21). This can be judged depending on whether the value acquired from the POWER_POLICY structure in step S2 is 0 or not. If the standby shift is "NO" (YES in S21), it is unnecessary to consider a shift to standby mode, so the high load period is set to "infinite" (S24). The low period also becomes "infinite".

If some standby shift period has been set (NO in S21), the high load period is set to the smaller one of ⅓ of the initial standby shift period (t1) and an arbitrary period less than the initial standby shift period (t1) (S26). In this way, it is certainly possible to set the high load period to be shorter than the low load period.

Figure 5:
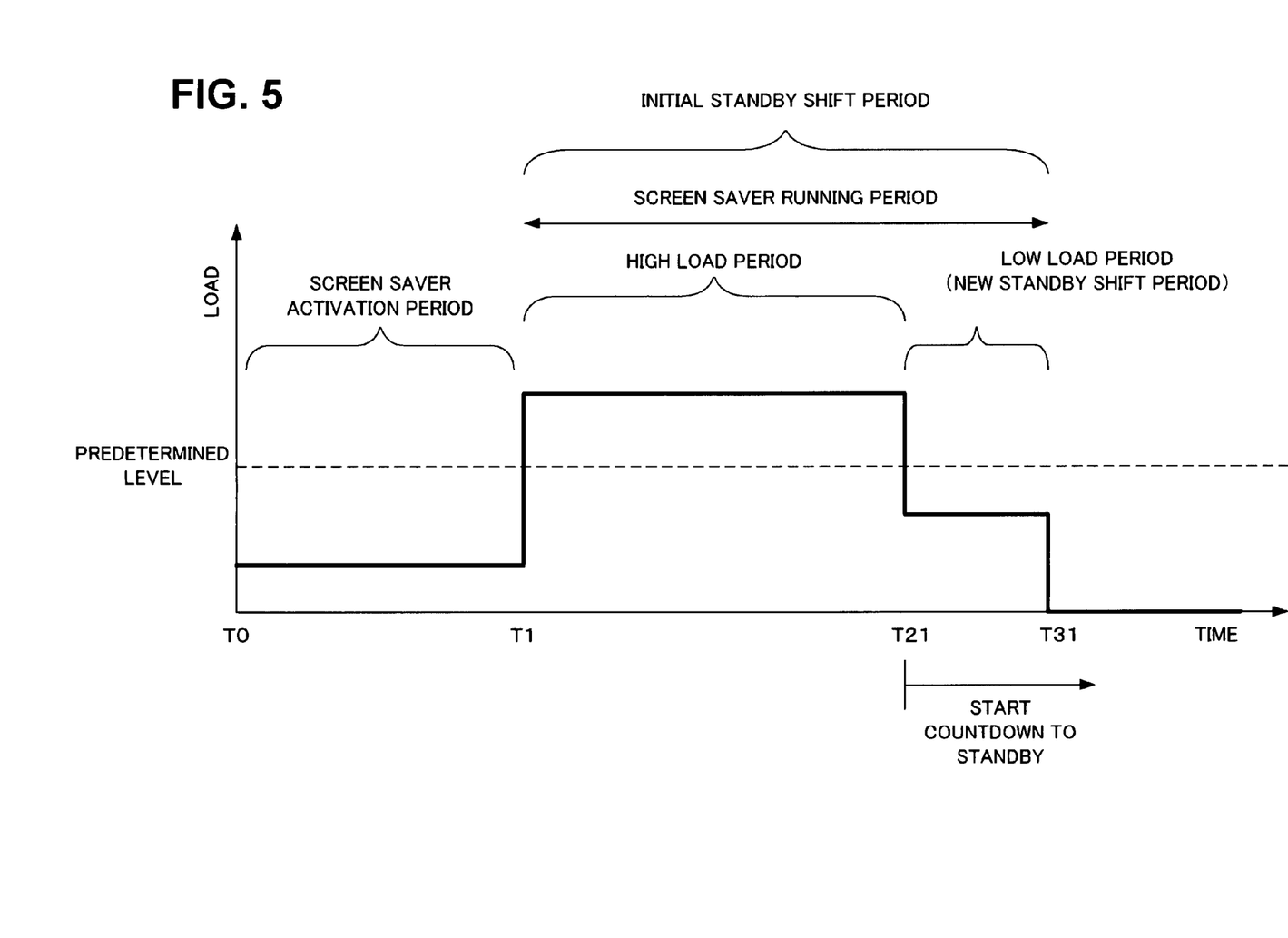
FIG. 5 is a diagram depicting the status of an information processing apparatus until shifting to standby mode according to the present embodiment.

FIG. 5 is a diagram depicting the status of the information processing apparatus until the shift to standby mode according to the present embodiment. The level indicated by the dotted line is the boundary of the load used by the OS to determine the shift to the standby mode. If a load exceeding this dotted line is applied, the OS does not execute the shift to standby mode.

At first, if the user does not operate the system during the screen saver activation period, the first screen saver is activated (time T1). During the activation of the first screen saver, a load exceeding the dotted line is applied to the system. After the first screen saver is displayed on the display section 18 during the high load period, the display control section 11 switches it to the second screen saver, and displays this on the display section 18 (time T21).

The load on the information processing apparatus 1 when the second screen saver is executed falls less than the dotted line, so the countdown to the standby shift starts from time T21, and if the user does not operate the system during the initial standby shift period from the time T21, the OS executes the shift to the standby mode. If a period corresponding to the low load period is set in step S4 in FIG. 3 as a new standby shift period, the operation control section 12 can shift the information processing apparatus 1 to the standby mode at time T31 when the display control section 11 ends the second screen saver (time T31).

As described above, according to the information processing apparatus of the present embodiment, the first screen saver with a high load, that is with a strong attraction to the user, is displayed first, then after a predetermined time has elapsed, it is switched to the second screen saver with a low load which allows a shift to the standby mode, so even if a screen saver with a high load is executed, a shift to the standby mode is possible without clearing the screen. Also switching the first screen saver to the second screen saver after a predetermined time prevents the user from becoming bored.

The operation control section 12 can reset the low load period as a new standby shift period, so the information processing apparatus 1 shifts to the standby mode along with the end of the display of the second screen saver, therefore the shift to the standby mode can be induced with certainty when the standby shift period, which was initially set in the information processing apparatus 1, has elapsed after the screen saver is activated, which prevents a delay in the shift to the standby mode.

The same effect can also be received by implementing operation of the information processing apparatus of the present embodiment by a terminal control method, or by a control program to be executed in the information processing apparatus. Instead of the control program for controlling the timing of switching the first screen saver program with a high load to the second screen saver program with a low load, the functions of the information processing apparatus of the present embodiment may be incorporated into the screen saver program itself.

In other words, the screen saver program according to the present embodiment reads and displays the images of which the load on the information processing apparatus is high (e.g. moving pictures with a high bit rate, slides where still images with a high number of pixels are continuous) from the storage section in the high load period, then reads and displays the images of which the load on the information processing apparatus is low (still images with a low number of pixels, slides where still images with few changes are continuous) from the storage section in the low load period.

The present embodiment is an information processing apparatus 1 which has an input section 17 for the user to operate, and the activation and end of screen savers is determined by the operation of the user, but this may be executed by signal input from the outside or by reception of data in a communication. The activation and end of screen savers may be determined merely by a specific operation, a specific signal input, or a specific reception of data in a communication. Therefore the present invention can be applied to an electronic device which does not have an input section 17, such as measurement equipment with a display device.

Also when the first screen saver is shifted to the second screen saver according to the present embodiment, loads to be posed to an electronic device may be decreased in steps. Specifically, it is possible that the first screen saver overwrites the entire screen with ten plus frames per seconds, then gradually shifts to the partial overwrite of the screen with ten plus frames, then finally only a part of the screen (e.g. logo) is flashed as the second screen saver.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An electronic device with a screen to display, comprising:
    a first screen saver section executing a first screen saver for displaying a first display image during a first execution period;
    a second screen saver section executing a second screen saver for displaying a second display image, of which an execution load on said electronic device related to displaying of the second display image is lower than the first screen saver, after said first execution period has elapsed; and
    a standby control section shifting to standby mode for decreasing a power consumption of said electronic device after a second execution period has elapsed from a start of the execution of said first screen saver,
    wherein said first execution period is determined based on a command signal to said electronic device, and
    said second execution period is determined based on whether a power supply configuration of said electronic device is an AC power supply or a battery.

2. The electronic device according to claim 1, wherein said second screen saver section executes said second screen saver from an end of the execution of said first screen saver to shifting to said standby mode.

3. The electronic device according to claim 1, wherein when data is input to said electronic device, the execution of said first screen saver or said second screen saver is stopped.

4. A computer readable medium having a program stored therein to cause a computer with a screen display to execute operations, the operations comprising:
    executing a first screen saver for displaying a first display image during a first execution period;
    executing a second screen saver for displaying a second display image, of which an execution load on said computer related to displaying of the second display image is lower than the first screen saver, after said first execution period has elapsed; and
    shifting to standby mode for decreasing a power consumption of said computer after a second execution period has elapsed from a start of the execution of said first screen saver,
    wherein said first execution period is determined based on a command signal for said computer, and
    said second execution period is determined based on whether a power supply configuration of said computer is an AC power supply or a battery.

5. The computer readable medium according to claim 4, wherein executing said second screen saver is during a period from end of the execution of said first screen saver to shifting to said standby mode.

6. The storage medium according to claim 4, wherein when data is input to said computer, the execution of said first screen save or said second screen saver is stopped.

7. A control method to be executed in a computer having a screen display function, comprising:
    executing a first screen saver for displaying a first display image during a first execution period;
    executing a second screen saver for displaying a second display image, of which an execution load on said computer related to displaying of the second display image is lower than the first screen saver, after said first execution period has elapsed; and
    shifting to standby mode for decreasing a power consumption of said computer after a second execution period has elapsed from a start of the execution of said first screen saver,
    wherein said first execution period is determined based on a command signal for said computer, and
    said second execution period is determined based on whether a power supply configuration of said computer is an AC power supply or a battery.

8. The control method according to claim 7, wherein in said executing said second screen saver, said second screen saver is executed during the period from end of the execution of said first screen saver to shifting to said standby mode.

9. The control method according to claim 7, wherein when data is input to said computer, the execution of said first screen saver or said second screen saver is stopped.

10. The control method according to claim 7, wherein said second execution period is determined based on a power supply configuration of said computer.

11. A method of controlling a screen display function on a computer comprising:
- updating the screen display with a first screen saver displaying a first display image during a first execution period, said first execution period determined based on a command signal for said computer;
- updating the screen display with a second screen saver displaying a second display image to lower the execution load on the computer in relation to the screen display with the first screen saver during the first execution period, after said first execution period has elapsed; and
- shifting to standby mode for decreasing a power consumption of said computer after a second execution period has elapsed from a start of the updating of said screen display with the first screen saver,
- wherein said first execution period is determined based on a command signal for said computer, and
- said second execution period is determined based on whether a power supply configuration of said computer is an AC power supply or a battery.

12. A method, comprising:
- executing a second screen saver for displaying a second display image and having a load different than a first screen saver for displaying a first display image on a computer, after a first time period related to an execution of the first screen saver has elapsed; and
- shifting the computer to a standby mode after a second time period related to the execution of the second screen saver has elapsed, the second time period is determined based on whether an AC power supply or a battery is connected to the computer.

13. An electronic device with a screen to display, comprising:
- a computer processor to execute
  - a first screen saver section executing a first screen saver for displaying a first display image during a first execution period, and
  - a second screen saver section executing a second screen saver for displaying a second display image, of which an execution load on said electronic device related to displaying of the second display image is lower than the first screen saver, after said first execution period has elapsed.

14. A control method to be executed in a computer having a screen display function, comprising:
- executing a first screen saver for displaying a first display image during a first execution period; and
- executing a second screen saver for displaying a second display image, of which an execution load on said computer related to displaying of the second display image is lower than the first screen saver, after said first execution period has elapsed.

* * * * *

UNITED STATES PATENT AND TRADEMARK OFFICE
CERTIFICATE OF CORRECTION

| | |
|---|---|
| PATENT NO. | : 7,565,629 B2 |
| APPLICATION NO. | : 10/927087 |
| DATED | : July 21, 2009 |
| INVENTOR(S) | : Kazuo Ikemoto |

It is certified that error appears in the above-identified patent and that said Letters Patent is hereby corrected as shown below:

Column 10, Line 43, change "storage" to --computer readable--.

Column 10, Line 44, change "execution" to --executing--.

Column 10, Line 45, change "screen save" to --screen saver--.

Signed and Sealed this

Third Day of November, 2009

David J. Kappos
*Director of the United States Patent and Trademark Office*